(12) United States Patent
Zhou

(10) Patent No.: US 10,766,398 B2
(45) Date of Patent: Sep. 8, 2020

(54) TIE DOWN WITH AUTOMATIC STRAP TENSION ADJUSTMENT

(71) Applicant: Wesley Zhou, Aliso Viejo, CA (US)

(72) Inventor: Wesley Zhou, Aliso Viejo, CA (US)

(*) Notice: Subject to any disclaimer, the term of this patent is extended or adjusted under 35 U.S.C. 154(b) by 0 days.

(21) Appl. No.: 16/848,688

(22) Filed: Apr. 14, 2020

(65) Prior Publication Data

US 2020/0238888 A1    Jul. 30, 2020

Related U.S. Application Data

(63) Continuation of application No. 15/900,587, filed on Feb. 20, 2018, now Pat. No. 10,632,895.

(51) Int. Cl.
*B60P 7/08* (2006.01)
*B65H 59/18* (2006.01)
*B65H 54/58* (2006.01)

(52) U.S. Cl.
CPC ............. *B60P 7/083* (2013.01); *B60P 7/0846* (2013.01); *B65H 54/585* (2013.01); *B65H 59/18* (2013.01)

(58) Field of Classification Search
CPC ....... B60P 7/083; B60P 7/0838; B60P 7/0846; B60P 7/0853; B65H 9/18; B65H 54/585
See application file for complete search history.

(56) References Cited

U.S. PATENT DOCUMENTS

| | | | | |
|---|---|---|---|---|
| 5,560,086 A | * | 10/1996 | Huang | B60P 7/083 24/68 CD |
| 6,641,116 B1 | * | 11/2003 | Huang | B60P 7/083 24/68 CD |
| 7,350,767 B2 | * | 4/2008 | Huang | B60P 7/083 24/68 CD |
| 9,751,450 B1 | * | 9/2017 | Zhou | B60P 7/083 |
| 2002/0195594 A1 | * | 12/2002 | Cauchon | B60P 7/083 254/243 |
| 2006/0196015 A1 | * | 9/2006 | Huang | B60P 7/0838 24/68 CD |
| 2006/0197071 A1 | * | 9/2006 | Huang | B60P 7/083 254/217 |
| 2009/0294565 A1 | * | 12/2009 | Ouchi | B60R 22/46 242/390.2 |
| 2012/0244999 A1 | * | 9/2012 | Tauriainen | A63B 21/0783 482/104 |
| 2016/0347233 A1 | * | 12/2016 | Kingery | B60P 7/083 |

* cited by examiner

*Primary Examiner* — Emmanuel M Marcelo
(74) *Attorney, Agent, or Firm* — Lapple Ubell IP Law, LLP; Franklin D. Ubell

(57) ABSTRACT

A tie down apparatus wherein a center leg of each of a pair of load springs is mounted in the space between a pair of drum pins, which space receives and holds a tied down strap. Each load spring is fixedly attached to a respective one of first and second ratchet wheels and a circular plate is positioned within each ratchet wheel and configured to rotate through a selected arc with respect to each ratchet wheel to limit the pre-load applied to the load springs.

4 Claims, 13 Drawing Sheets

TIE DOWN WITH AUTOMATIC STRAP TENSION ADJUSTMENT

RELATED APPLICATION

This application is a continuation of U.S. patent application Ser. No. 15/900,587 of the same title and filed Feb. 20, 2018, which application is incorporated by reference herein in its entirety.

BACKGROUND

Field

The subject disclosure relates to tie down mechanisms and more particularly to a tie down mechanism featuring automatic adjustment of the tension applied to a strap component of the mechanism.

Description of Related Art

Various tie down mechanisms have been constructed in the past and have been employed, for example, to tie down a load to a trailer or other transport vehicle. In such applications, such tie down mechanisms typically have a first strap which is secured to the load and a second strap which is attached to the trailer.

SUMMARY

According to an illustrative embodiment, a tie down apparatus includes a drum comprising first and second drum pins separated by a space, the space being shaped to receive and hold a tie down strap as well as first and second ratchet wheels, the first and second ratchet wheels each comprising a plurality of ratchet teeth.

First and second spiral load springs are each mounted adjacent an outside surface of one of the first and second ratchet wheels. Each spiral load spring has a center leg and a tab at an outer end thereof. In the illustrative embodiment, the center leg of each spiral load spring is inserted in the space between the first and second drum pins, and the first end of each tab of each spiral load spring is fixedly attached to a respective one of the first and second ratchet wheels, such that as the ratchet wheels are rotated, a preload is applied to the first and second load springs.

Further in the illustrative embodiment, first and second circular plates are mounted in a central opening in each ratchet wheel and have first and second openings shaped to respectively receive opposite ends of the first and second drum pins. The ratchet wheels have inwardly projecting nubs positioned to come into engagement with outwardly projecting nubs on the first and second circular plates as each ratchet wheel rotates with respect to its respective circular plate. In an illustrative embodiment, these nubs interact so as to limit the amount of pre-load applied to each load spring.

According to the illustrative embodiment, rotation of the ratchet wheels to tighten the tie down strap pre-loads the spiral load springs to the same tension applied to the strap up to a limit established by the interaction of the respective nubs of the ratchet wheels and circular plates. If the strap were to lose tension below the preload spring rate of the spiral springs, then the springs act to force the drum pins to rotate and increase tension on the strap until the preload tension of the springs and the strap tension are in equilibrium or until the springs have lost all of their preload.

According to another aspect of the disclosure, a method of strap tension adjustment for a tie down apparatus is provided comprising attaching an outer end of first and second load springs to respective outside surfaces of respective first and second ratchet wheels, inserting an inner leg of each load spring into a space between respective rotating pins of the tie down apparatus, positioning a plate within a central opening in each ratchet wheel, and configuring each plate to rotate in unison with the respective rotating pins. Further according to the method, an inner periphery of each of the ratchet wheels and an outer periphery of a respective one of the plates are shaped such that the inner periphery and outer periphery interact so as to stop rotation of the first and second ratchet wheels with respect to the plates at a selected point so as to limit an amount of pre-load force applied to the load springs.

According to another aspect of the disclosure, first and second plates are each sandwiched between the outside surface of a respective one of first and second ratchet wheels and an inside surface of corresponding spiral load springs, each spiral load spring having a center leg and a tab at an outer end thereof, wherein the tabs and respective ratchet wheels are configured to rotate in unison together through a first range of motion and wherein the center leg of each of the first and second load springs is positioned in the space between the drum pins of a tie down apparatus. Each of the first and second plates has a cut-out arc portion in its perimeter having first and second end surfaces, and the tab of each spiral load spring is positioned to move within the cut-out arc from the first end surface to the second end surface, such that, as the first and second ratchet wheels are driven in a direction so as to tighten a tie down strap, the tab of each spiral load spring is driven toward the second surface until it abuts that second surface. After such abutment, the first and second ratchet wheels are constrained to rotate in unison with the first and second plates such that no further load is applied to the spiral load springs. In one embodiment, each tab is fixedly attached in a slot in each respective ratchet wheel. In another embodiment, each tab engages a bump formed on each respective ratchet wheel. In another embodiment, each tab is step-shaped and is inserted into a mating step-shaped opening in a respective ratchet wheel

DETAILED DESCRIPTION

Figure 1:
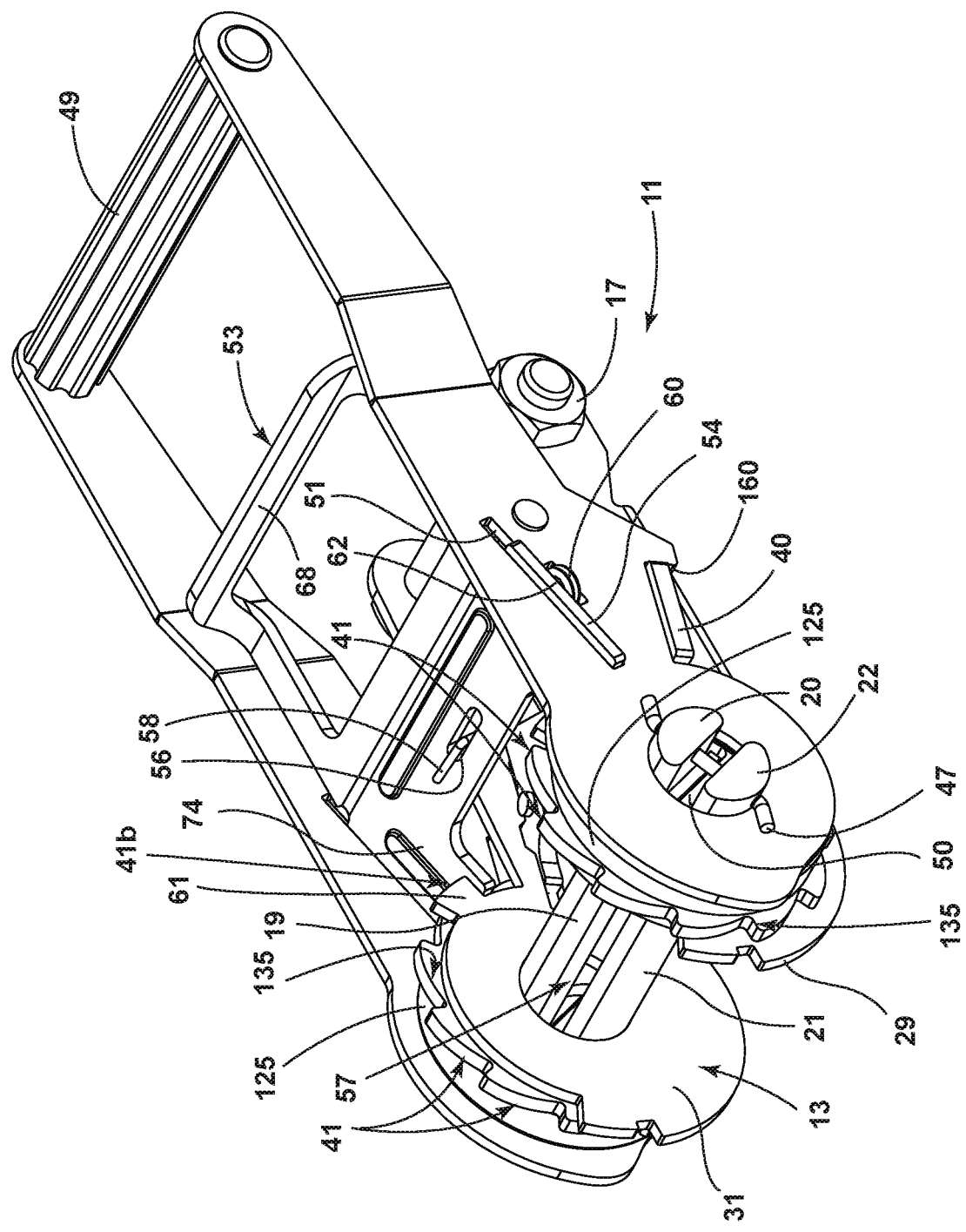
FIG. 1 is front perspective view of a tie down apparatus according to an illustrative embodiment in a first position.

FIGS. 1-10 show an illustrative embodiment of a self-adjusting tie down apparatus 11. The illustrative embodiment 11 includes a base frame 13, which is attached to a fixed strap 112 (FIG. 7) secured by a bolt 15 and nut 17. A "drum" 18, which comprises two drum pins 19, 21, rotates in respective circular openings 50 in respective end plates 29, 31 of the base frame 13. This drum 18 is caused to rotate by respective center legs 123 of respective main load springs 125, one spring 125 on each side of the drum 18 and positioned adjacent the outer sides of respective first and second ratchet wheels 135. A tab 136 at the outer end of each main load spring 125 is inserted into a slot 142 in the side of each ratchet wheel 135 and, in one embodiment, is fixedly attached to the respective ratchet wheel 135, for example, by welding.

In an illustrative embodiment, each main load spring 125 is a spiral wound spring. A circular plate 148 is centered within each ratchet wheel 135, as shown for example in FIG. 5. In the illustrative embodiment, each circular plate 148 is positioned between a respective load spring 125 and one of the end plates 29, 31 of the base frame 13 and is thereby held in place axially.

In the illustrative embodiment, the interior circular periphery of each ratchet wheel 135 has three radially positioned inwardly projecting nubs 151, 153, 155 formed thereon separated from one another by 120 degrees. Correspondingly, each circular plate 148 has three radially positioned outwardly projecting nubs 152, 154, 156 formed on its outer circular periphery and separated from one another by 120 degrees. The components are sized such that the nubs 152, 154, 156 of each circular plate 148 will come into contact with the nubs 151, 153, 155 of the respective ratchet wheels 135 if the ratchet wheels 135 are rotated through a selected arc with respect to the circular plates 148. Each circular plate 148 further has slots 232, 234, which receive the ends 20, 22 of the drum pins 19, 21 and are shaped conformably such that the circular plates 148 are forced to rotate in unison with the drum pins 19, 21.

Figure 5:
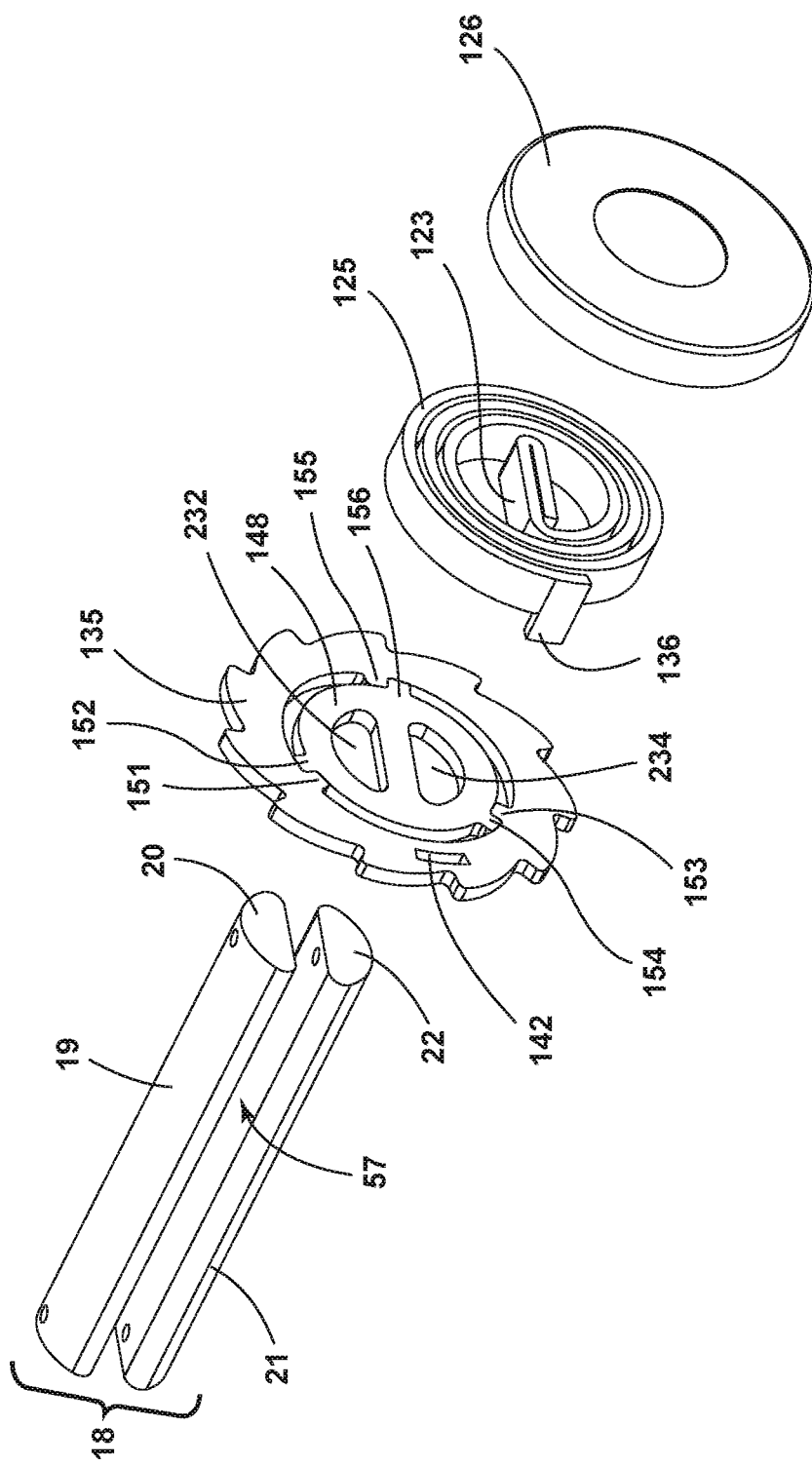
FIG. 5 is an exploded view of the tension adjustment apparatus of FIG. 4.

In assembly of the apparatus of FIG. 5 according to an illustrative method of assembly, the drum pins 19, 21 are first inserted into the openings 50 in the end plates 29, 31 of the base frame 13. Each load spring tab 136 is then welded or otherwise attached to its respective ratchet wheel 135. Each circular plate 148 is then slid onto the opposite ends of the drum pins 19, 21. The springs 125 with ratchet wheels 135 attached are then mounted onto opposite ends of the drum pins 19, 21 by placing the leg 123 of each spring 125 in the slot 57 between the drum pins 19, 21 and pushing the legs 123 into the slot 57, while allowing each circular plate 148 to come into position within its respective ratchet wheel 135. In one embodiment, an end cover 126 may be slid over the outer periphery of the load spring 125 and ratchet wheel 135 to cover the assembly.

Figure 3:
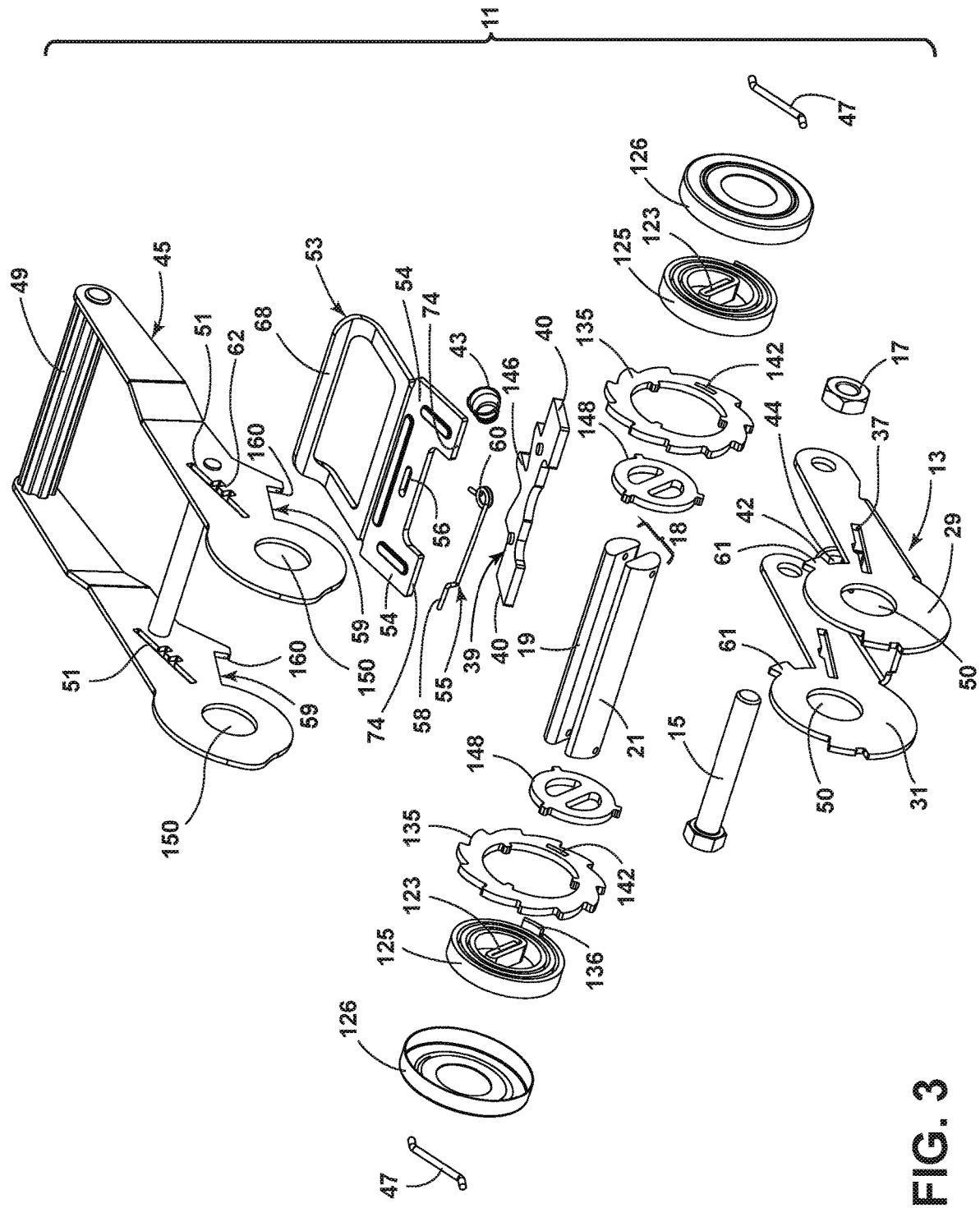
FIG. 3 is an exploded view of the tie down apparatus according to the illustrative embodiment.
Figure 4:
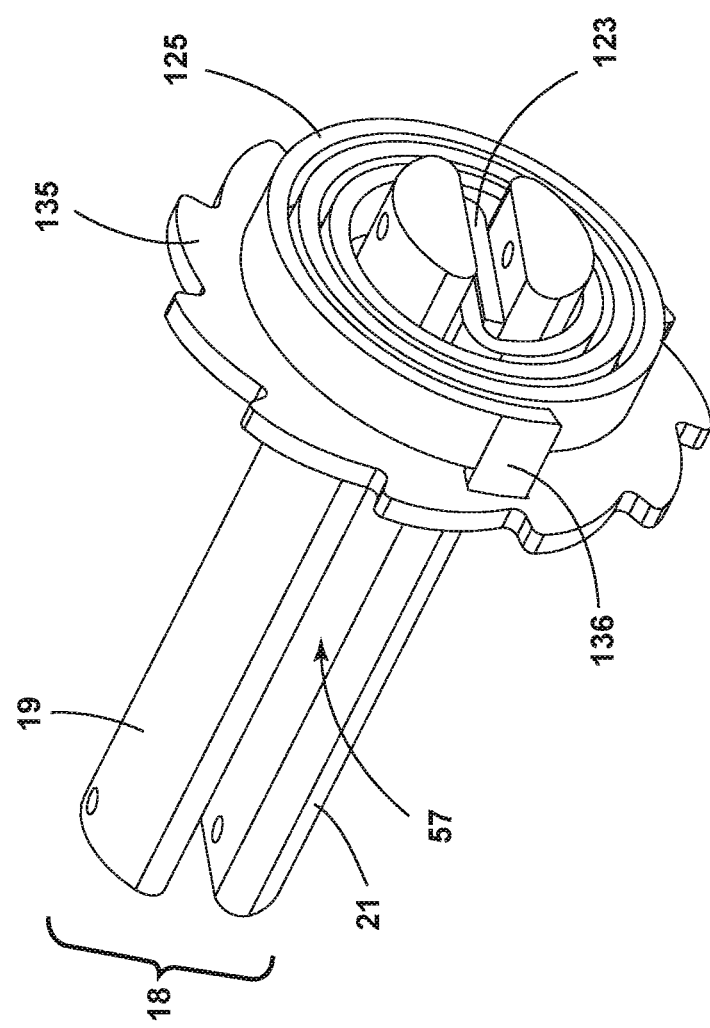
FIG. 4 is a perspective view of tension adjustment apparatus according to an illustrative embodiment in an assembled state.
Figure 8:
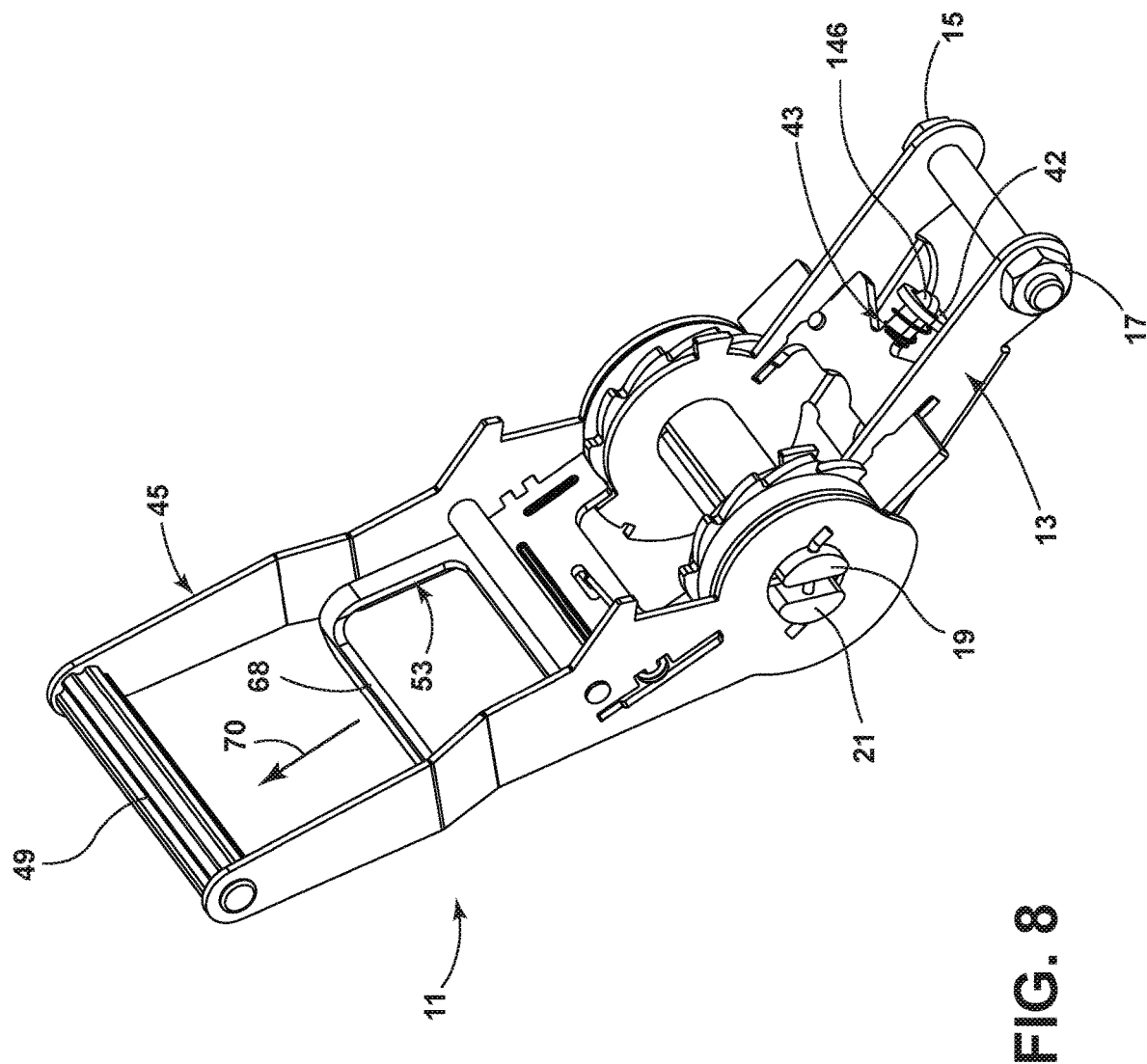
FIG. 8 is a perspective view of the tie down apparatus of the illustrative embodiment in a third position.

Each side of the base frame 13 has an angled slot 37 into which fits respective wings 40 of a main latch 39. The main latch 39 can slide in the slots 37 and engage the teeth, e.g. 41, of each ratchet wheel 135 and is spring loaded toward each ratchet wheel 135 by a main latch spring 43 (FIGS. 3, 8). The main latch spring 43 is mounted on a pin 146 projecting from a rear side of the main latch 39 and is held in place by an upright projection 42 on the base frame 13, which has a slot 44 (FIG. 3) through which the pin 46 fits.

A handle frame 45 has circular openings 150 (FIG. 3) through which project the respective ends, e. g. 20, 22, of the drum pins 19, 21. Two pins 47 respectively inserted through the drum pins 19, 21 on either side of the device serve to hold the mechanism together.

The handle frame 45 has a handle 49 at one end that is easy to grip and a pair of slots 51 in which fit respective wings 54 of a handle latch 53. The handle latch 53 slides in the slots 51 and engages respective teeth, e.g. 41*b* (FIG. 1), of each ratchet wheel 135. The handle latch 53 is spring loaded toward the ratchet wheel 135 by a handle spring 55 (FIG. 3). The handle latch 53 has a slot 56 in which fits one end 58 of the handle spring 55, while the coiled end 60 of the handle spring 55 fits over and is retained by a pin 62 formed in the slot 51 of the handle frame 45.

Figure 2:
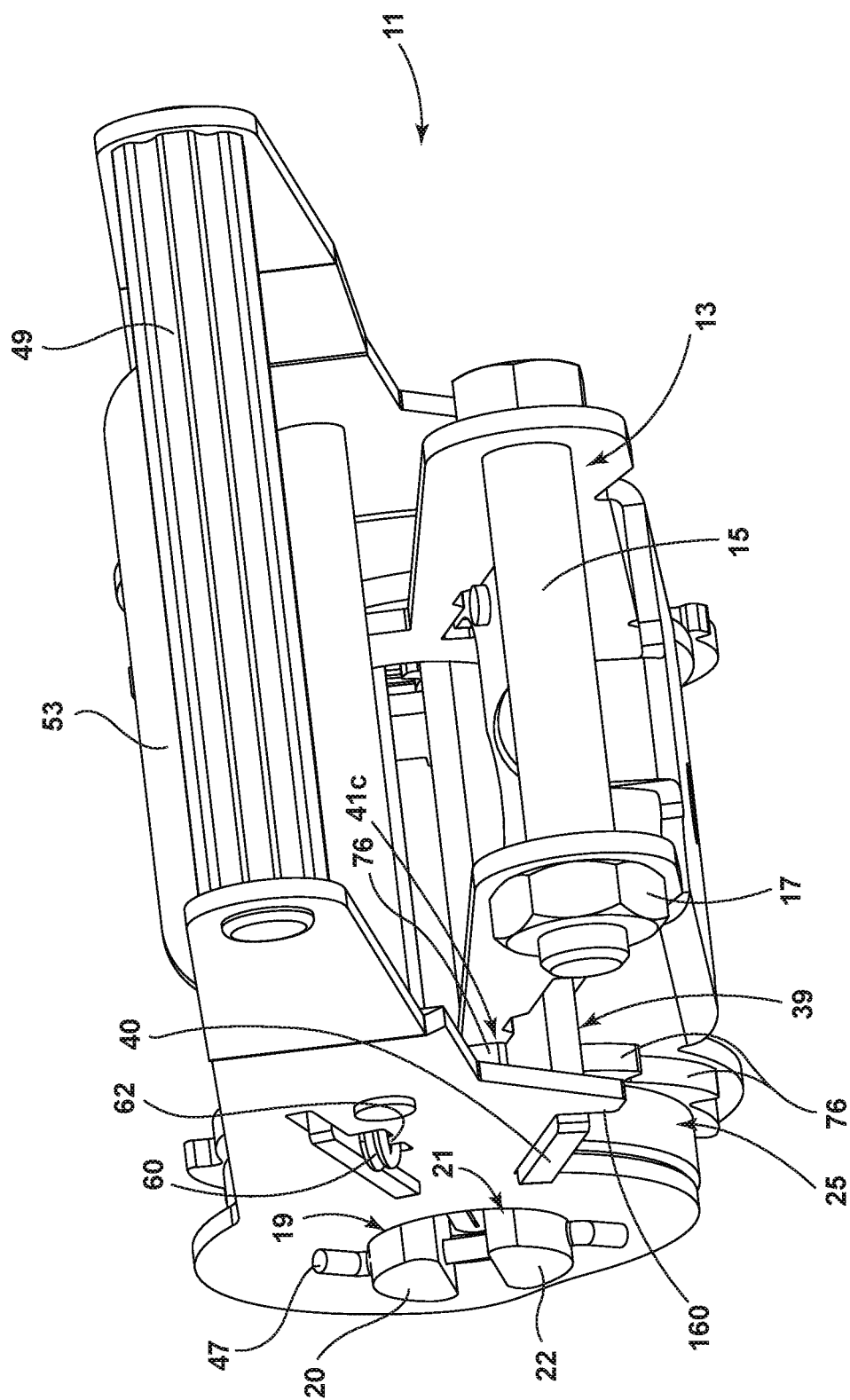
FIG. 2 is a rear perspective view of the tie down apparatus of FIG. 1.
Figures 6, 7:
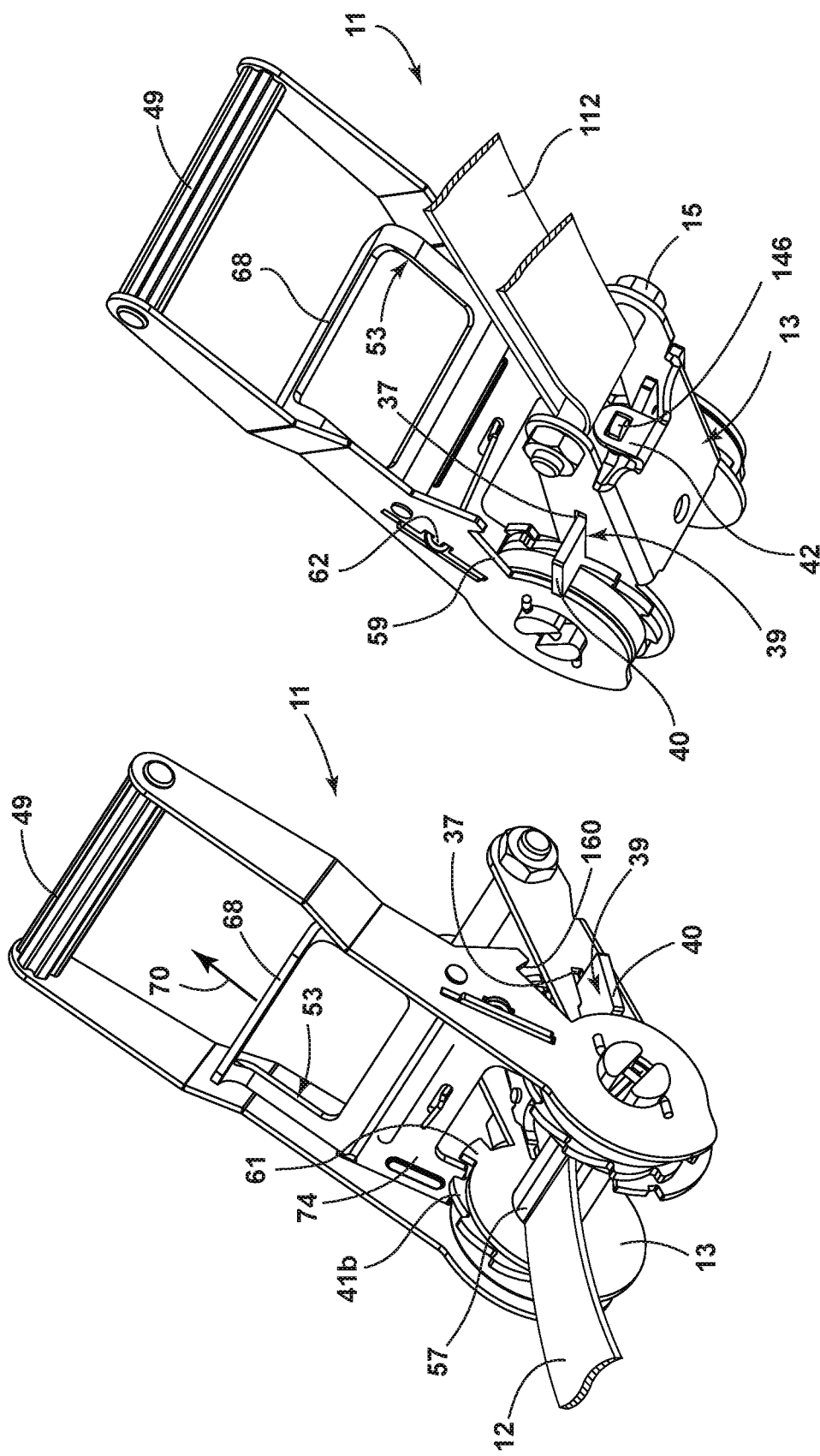
FIG. 6 is a front perspective view of the tie down apparatus of the illustrative embodiment in a second position.
FIG. 7 is a rear perspective view of the tie down apparatus of FIG. 6.

The tie down 11 is used by inserting a strap 12 through the slot 57 in between the two drum pins 19, 21, as shown in FIG. 6. As shown in FIG. 2, in a first position, the main latch 39 is engaging a tooth 41*c* of each of the ratchet wheels 135, specifically by engagement with the front surface of those two ratchet teeth, e.g. 41*c*. As shown in FIGS. 1 and 2, in the first position, the handle frame 45 is at its lowest point of rotation, lying generally parallel to the base frame 13. In this position, rear surfaces 160 of the respective recesses 59 (FIG. 3) of the handle frame 45 engage the respective wings 40 of the main latch 39 and prevent the main latch 39 from disengaging from the ratchet wheel teeth, e.g. 41*c*.

Additionally, in the first position shown in FIGS. 1 and 2, each surface 74 of the spring loaded handle latch 53 is engaging each ratchet wheel 135 via engagement with the front surface of a respective oppositely disposed pair of ratchet teeth, e.g. 41*b*. In this position, the respective surfaces 74 on the handle latch 53 are also locked behind a respective step 61 formed on the circumference of the base frame 13, which prevents the handle latch 53 from rotating around the drum 18.

As illustrated in connection with FIG. 6, by pulling the handle 68 of the handle latch 53 against its spring bias away from the base frame 13 in the direction of arrow 70, the surfaces 74 on the handle latch 53 will clear the steps 61 in the base frame 13, and the handle frame 45 can then rotate into a second position shown in FIGS. 6 and 7. This action also clears wings 40 of the main load latch 39 from engagement with the rear surfaces 160 of the recesses 59 such that the main load latch 39 is now free to slide back and forth in its respective slots 37 while engaging the teeth, e.g. 41*c*, on each ratchet wheel 135.

By rotating the handle frame 45 through an arc from the second position to the third position shown in FIG. 8, each ratchet wheel 135 will rotate through the same arc. In an illustrative embodiment, this arc amounts to three ratchet teeth out of eleven total=an arc of approximately 98 degrees. This rotation causes each main load spring 125 to rotate the drum pins 19, 21 through the same angle, as long as there is no tension load on the strap 12. At the same time, the main load latch 39 shuttles back and forth following the rear cammed or contoured surfaces 76 (FIGS. 2, 4, 5) of three successive ratchet teeth 41 of each ratchet wheel 135, thus "ratcheting" three times in the illustrative embodiment. At the end of this ratcheting action, the main load latch 39 again engages behind the flat surface of the next successive ratchet tooth of each ratchet wheel 135, as shown in FIG. 2.

After the handle frame 45 reaches the third position of FIG. 8, it is rotated from the third position back to the second position while the handle latch 53 slides back and forth following the rear profile 76 of each ratchet wheel tooth, again "ratcheting" three times and engaging at the end of the travel behind the flat surface of another pair of ratchet teeth. During travel from the third position back to the second position, the drum pins 19, 21 do not rotate, and the tension on the strap is maintained by the main load latch 39.

Figure 10:
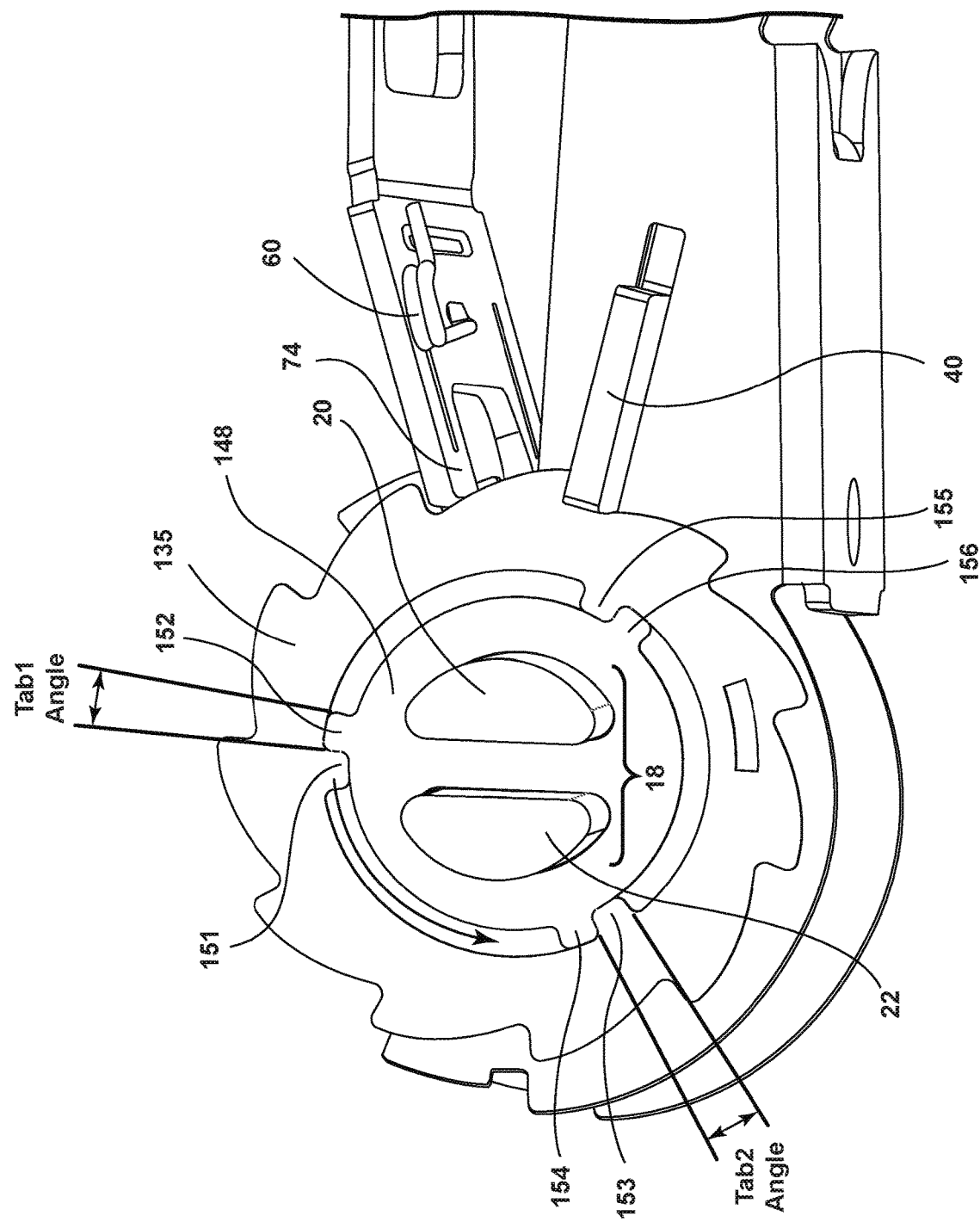
FIG. 10 is a side view of the tension adjustment apparatus of FIGS. 4 and 5.

This process of rotating the handle frame 45 between the second and third positions will continue and in turn will put additional load on the strap 12, and therefore each main load spring 125 will also be preloaded to the same level of tension. As each main load spring 125 is preloaded, each nub 151, 153, 155 of each ratchet wheel 135 begins to rotate toward the corresponding nub 154, 156, 152 of each circular plate 148 as illustrated in FIG. 10. In this respect, nub 151 approaches and eventually comes into abutment with nub 154, nub 153 approaches and eventually comes into abutment with nub 156, and nub 155 approaches and eventually comes into abutment with nub 152.

In an illustrative embodiment, if the nubs are each 10 degrees "wide," (Tab 1, Tab 2 angles), then the maximum angular rotation of the ratchet wheels 135 before the nubs of the ratchet wheels 135 engage the nubs of the circular plates 148 is 120 degrees minus 20 degrees equals 100 degrees. When the nubs so engage, the ratchet wheels 135 are prevented from rotating further with respect to the circular plates 148 and the pins 19, 21, and further loading of the load springs 125 ceases. At this point, the load springs 125 have reached the maximum preload permitted by the particular design of the device. In an illustrative embodiment, the maximum angular rotation during which preload is applied is 100 degrees, but may range from 40 to 340 degrees in other embodiments, depending, for example, on the type of spring tension selected, number of nubs, and the application for which the tie down is used. In other embodiments, the circular plates 148 and ratchet wheels 135 could each have less than three nubs respectively, for example, two nubs on each of the circular plates 148 and ratchet wheels 135, or one nub. Thus, for example, each circular plate 148 may have at least one outwardly protruding nub and each ratchet wheel 135 may have at least one inwardly protruding nub.

Once each main load spring 125 has gone through an approximately 100 degrees preload angle, further preload on the main load springs 125 ceases in order to prevent overloading those springs 125, and any further tension generated by rotating the handle frame 45 from the second to the third position will now in turn directly rotate the drum pins 19, 21, and add additional load tension to the strap 12. When the tie down operation is complete, the tie down 11 is in the locked position shown in FIGS. 1 and 2.

In the event that the strap 12 were to lose tension below the preload spring rate of the main load springs 125, then the main load springs 125 will force the drum pins 19, 21, to rotate and increase tension on the strap 12 until the preload tension of the main load springs 125 and the strap tension are in equilibrium or until the main load springs 125 have lost all of their preload.

Figure 9:
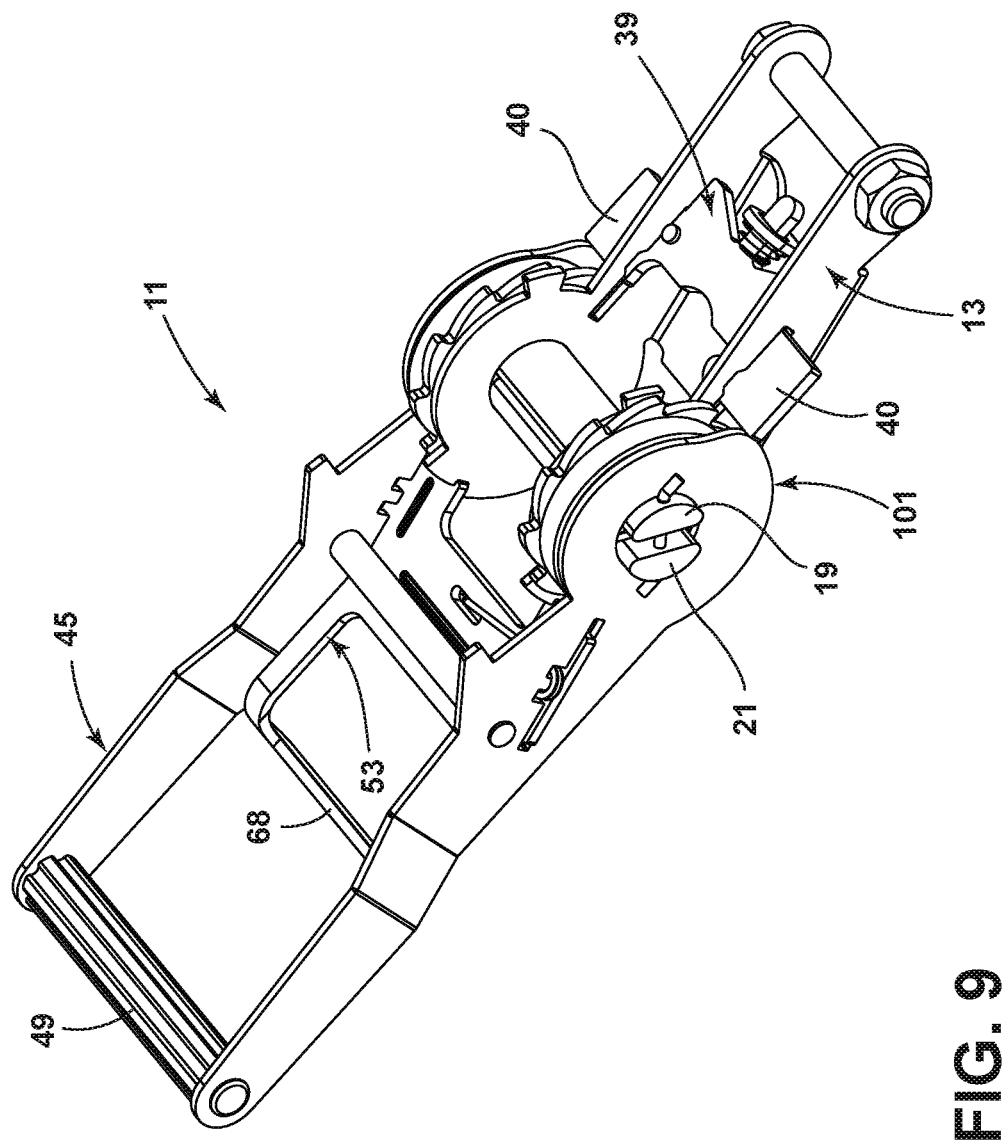
FIG. 9 is a perspective view of the tie down apparatus in a fourth position.

As shown in connection with FIG. 9, when the apparatus is in the position shown in FIG. 8, pulling on the handle latch handle 68 against its spring bias further in the direction of the arrow 70 allows the handle frame 45 to move into a fourth position shown in FIG. 9. This action disengages the handle latch 53 from the ratchet wheel teeth completely. At the same time, a ramp 101 on the exterior of the handle frame 45 also pushes the main load latch 39 away from the ratchet wheel teeth 41. This effectively allows the drum pins 19, 21 completely free rotation, removes the tension on the strap 12, and releases any remaining tension on the main load springs 125.

Figure 11:
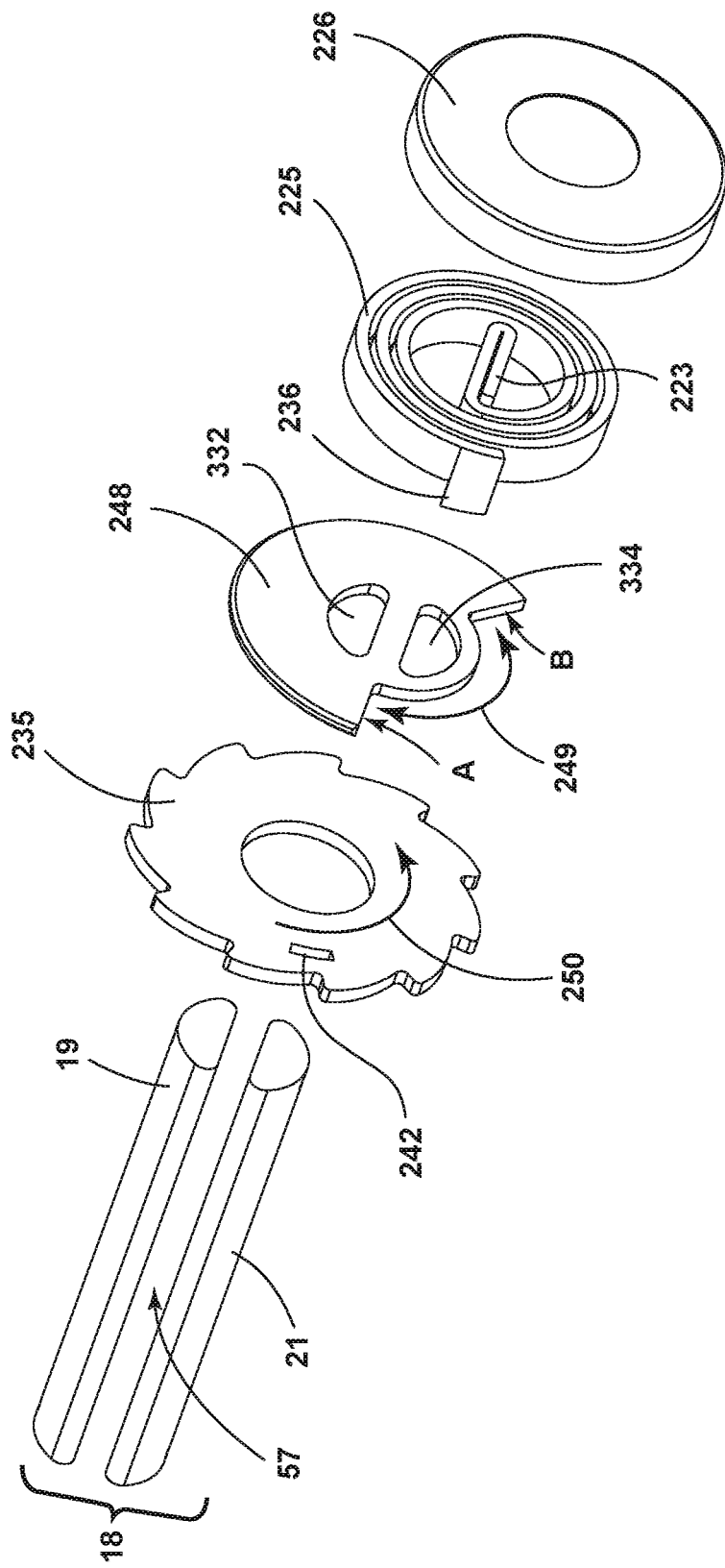
FIGS. 11 and 12 are perspective views illustrating another embodiment of tension adjusting apparatus.
Figure 12:
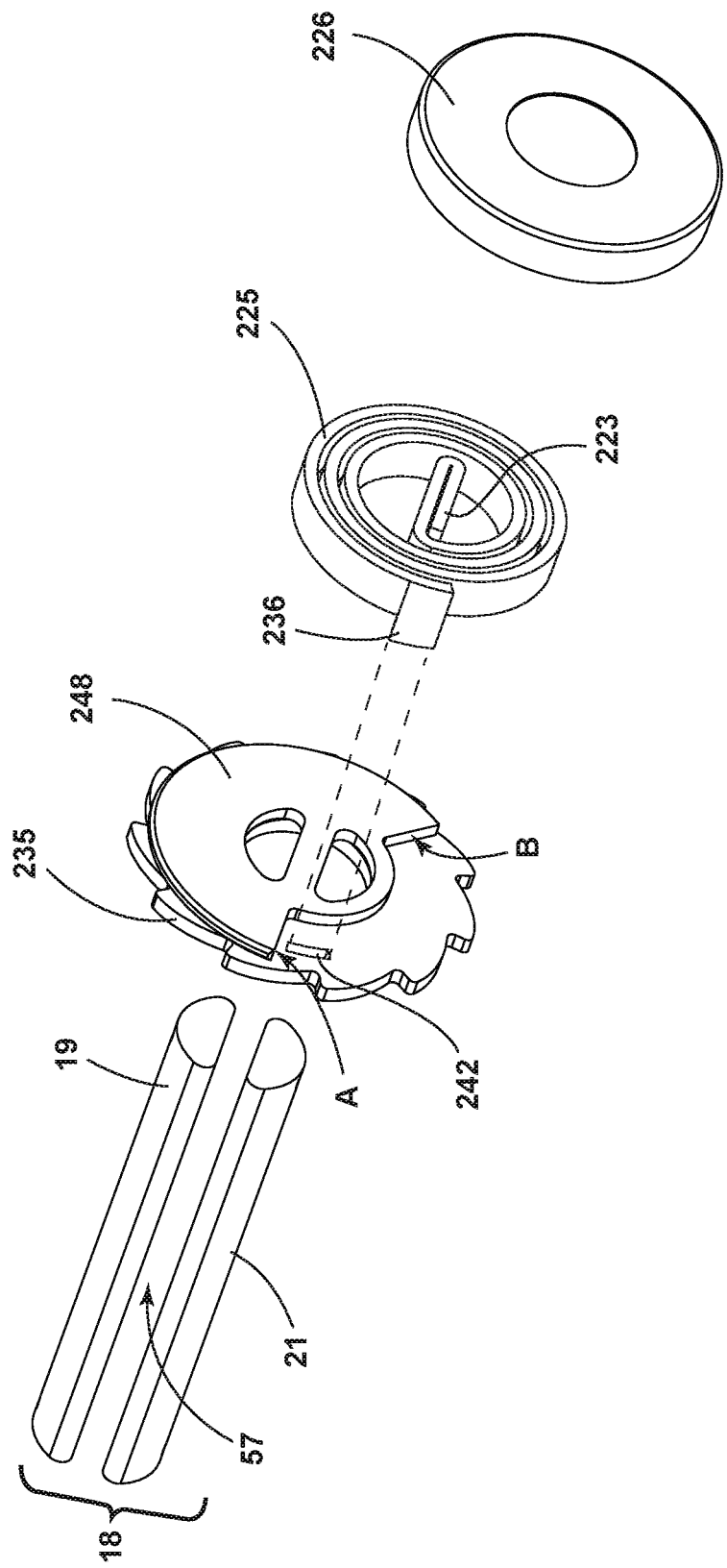

FIGS. 11-14 illustrate alternative embodiments for enabling the ratchet wheels of the tie down mechanism to first rotate freely with respect to the load pins 19, 21 and to thereafter stop that free rotation at a point after the spiral springs have been loaded to a degree which enables maintaining tension on the strap of the tie down mechanism. In an embodiment illustrated in FIGS. 11 and 12, a plate 248 has a cut-out arc 249, which provides two surfaces designated "A" and "B." A first tab 236 at the end of a spiral load spring 225 is fixedly attached in a notch or opening 242 in a ratchet wheel 235, while the inner end 223 of the spiral load spring 225 is inserted into the gap 57 between the load pins 19, 21. As illustrated in FIG. 12, each plate 248 is sandwiched between its respective ratchet wheel 235 and spiral load spring 225. In this configuration, as the ratchet wheels 235 are driven in the direction of the arrow 250 (FIG. 11), the tab 236 will be driven rotationally from surface A toward the surface B until it abuts that surface B. Thereafter, the ratchet wheels 235 are constrained to rotate in unison with the plates 248 and pins 19, 21, and no further load is applied to the spiral load springs 225.

Figure 13:
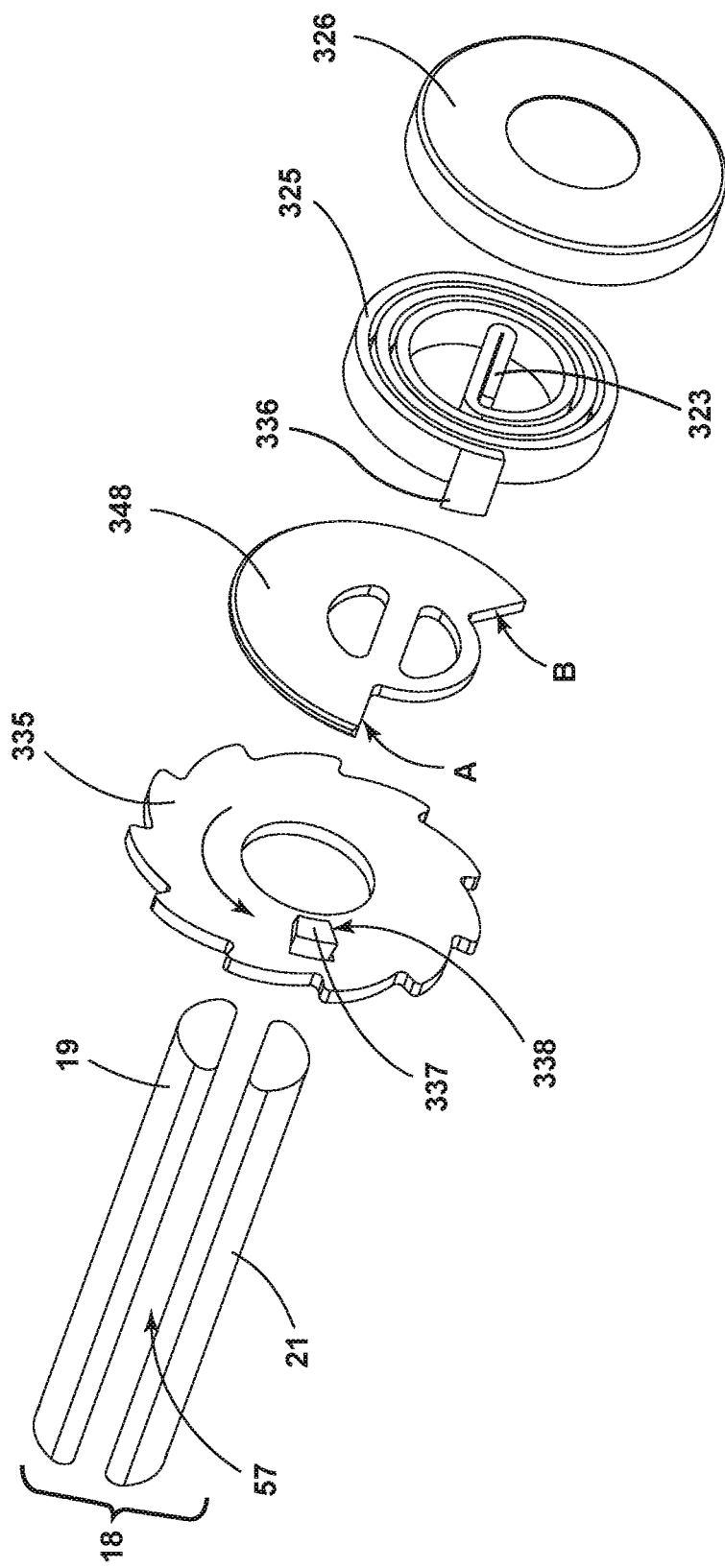
FIG. 13 is a perspective view illustrating another embodiment of tension adjusting apparatus.
Figure 14:
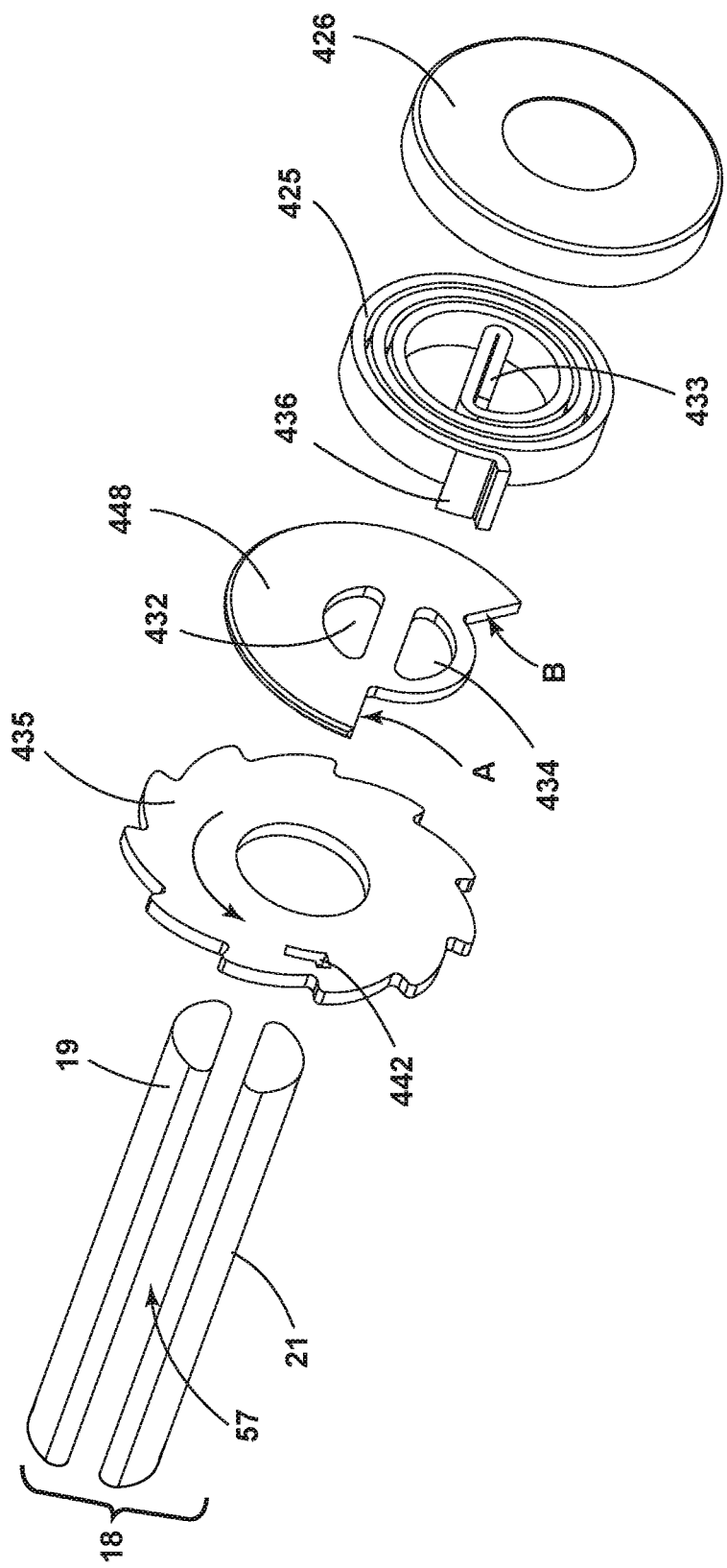
FIG. 14 is a perspective illustrating another embodiment of tension adjusting apparatus.

The embodiment of FIG. 13 is constructed and functions similarly to that of FIGS. 11-12, the only difference being that each tab 336 of each spiral load spring 325 engages its respective ratchet wheel 325 through abutment with the bottom edge 338 of a "bump" 337, which is fixedly attached to, or integrally formed as part, of each ratchet wheel 335. The embodiment of FIG. 14 is similarly constructed with the exception that the tab 436 of the spiral load spring 425 is formed as a stepped edge, which mates with a stepped opening 442 in the ratchet wheel 435. In various embodiments, the tab 436 may slide fit together with the stepped opening 442, may press-fit into that opening 442, or may be welded in place in the opening 442.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:
1. A method of providing strap tension adjustment for a tie down apparatus comprising:
   providing a rotatable drum surface configured to wind up a tie down strap and having a slot therein configured to receive the tie down strap;
   providing a ratchet wheel comprising a plurality of ratchet teeth and having an interior opening with at least one inwardly protruding nub positioned thereon;
   mounting a spiral load spring having an outer tab and an inner leg adjacent the ratchet wheel;
   causing the inner leg of the spiral load spring to rotate in unison with said rotatable drum surface;
   causing the outer tab of said spiral load spring to rotate in unison with said ratchet wheel so as to load said spiral load spring;
   causing a nub engaging surface to rotate in unison with said rotatable drum surface within said interior opening of said ratchet wheel so as to come into engagement with said inwardly protruding nub as said ratchet wheel rotates such that the engagement between the inwardly protruding nub and the nub engaging surface terminates loading of said spiral load spring.

2. The method of claim 1 wherein termination of loading of said spiral load spring limits an amount of pre-load force applied to said spiral load spring.

3. The method of claim 1 wherein the interior opening of the ratchet wheel comprises a circular surface on which said nub is formed.

4. The method of claim 3 wherein said plurality of ratchet teeth are circumferentially disposed around an outer surface of said ratchet wheel.

\* \* \* \* \*